UNITED STATES PATENT OFFICE.

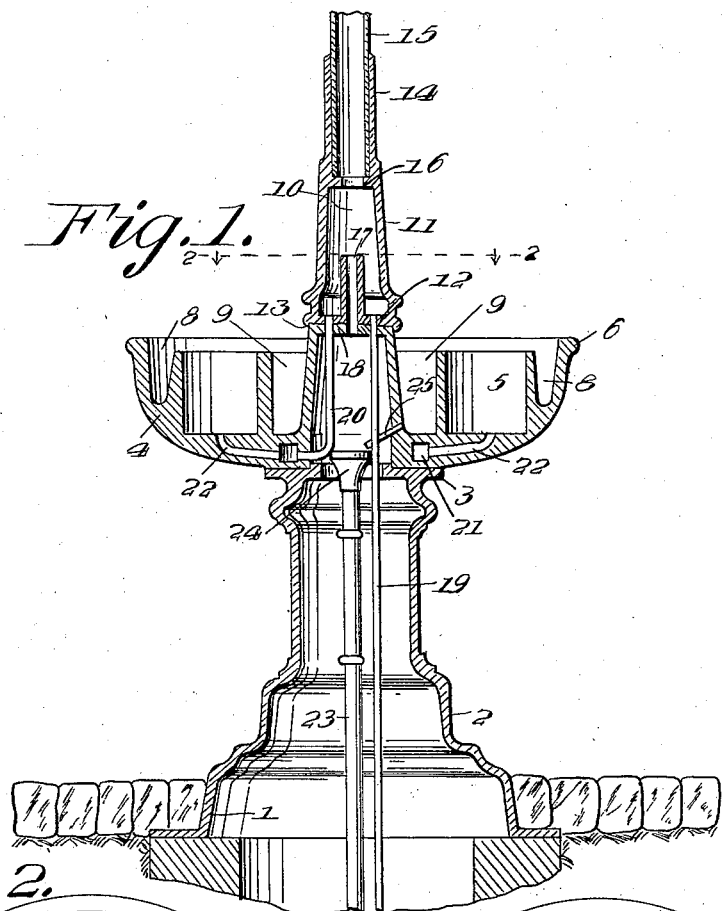

FRED A. THOMAS, OF PAWTUCKET, RHODE ISLAND.

DRINKING-FOUNTAIN.

1,069,043.  Specification of Letters Patent.  Patented July 29, 1913.

Application filed April 4, 1912. Serial No. 638,350.

*To all whom it may concern:*

Be it known that I, FRED A. THOMAS, a citizen of the United States, residing at Pawtucket, in the county of Providence and State of Rhode Island, have invented a new and useful Improvement in Drinking-Fountains, of which the following is a specification.

This invention pertains to a certain new and useful improvement in drinking fountains, and pertains more particularly to fountains of this type used for watering animals, though adapted for other uses as will later appear.

The object of the invention is to provide a fountain of this type in which individual cups are provided for the animals and located in a main or common basin, the individual cups being supplied directly with the water, the latter upon filling the cups overflowing and consequently maintaining the edges of the cups clean and in sanitary condition, the overflow entering the main or common basin from which it is drained.

Further the invention contemplates a simple, inexpensive and efficient device of this character of neat and attractive appearance, providing ample accommodations for the watering of a number of animals simultaneously.

In the drawings—Figure 1 is a vertical sectional view of the invention. Fig. 2 is a section taken on the line 2—2 of Fig. 1, and Fig. 3 is a similar view of a modified form of the invention.

In carrying the invention into practice, a stand or casting is provided which consists of a base member 1, and a body portion 2, the latter having an outwardly extending horizontal flange 3 at its top. The main or common basin 4 rests on and is secured to the flange 3 and is formed on its interior with a series of integrally spaced cups 5, which extend upwardly from the bottom of basin 4. The cups 5 are spaced from one another, from the rim 6 of the basin which extends above the tops of the cups, and from the hollow center post 7, which latter extends above the rim 6. Thus a channel 8 is formed between rim 6 and the cups, and a further channel 9 between the cups and the post 7, both of the channels being of circular form.

A chamber 10 is formed in a member 11, which member has its bottom 12 formed with a depending circumferential flange 13, which encircles and snugly fits over the post 7. Member 11 is formed with an upward extension 14, which is hollow and receives an open-ended pipe 15, which latter may carry suitable lights or be provided with ornamental features. An abutment 16 in the top of the chamber 10, acts as a seat to receive the bottom end of the pipe 15, and restricts the downward movement thereof. A short pipe 17 is provided on the bottom 12 of chamber 10, the pipe registering with an opening formed therefor in a flange 18 which latter is carried by the top of post 7 and abuts the bottom 12 which is secured to the flange in any approved manner.

A water feed pipe 19 extends up through the body 2, through post 7, and through openings provided therefor in the flange 18 and in the bottom 12 of the chamber 10. A second water pipe 20 which is short in length, extends from the bottom of chamber 10 into a circular chamber 21, which is formed in the bottom of the basin 4, and from the circular chamber 21, passages 22 extend terminating in the respective centers of the cups 5, as shown in Fig. 1, by means of which it will be seen that each cup is fed with water which enters its bottom.

A water discharge pipe 23 extends up through body 2 and has an enlarged head 24, with a wide mouth which is disposed at the bottom of post 7, at the free or bottom end of an inclined discharge pipe 25, which has its inner end leading into the annular channel 9, through the post 7, which forms one wall of the channel.

The modification depicted in Fig. 3 of the drawings is identical in all respects with that shown in Figs. 1 and 2, with the exception of the form or shape of the cups 5', which are non-circular as distinguished from the circular shape illustrated in Fig. 2.

In operation water flowing from the pipe 19, enters chamber 10, enters pipe 20, and flows into the chamber 21 in the basin, and is fed from the latter into the several individual cups by means of the respective passages 22 provided for such purpose. The water entering the cups 5 at the bottom of the same flows upwardly and over the edges of the cups, maintaining same clean and in sanitary condition. The overflowing water thus enters channel 9 and is taken from the latter by means of the inclined pipe 25, which discharges the water into the head 24 of the discharge pipe 23. It will be seen that the pipe 17 acts as a safety pipe to prevent undue flow of water to the cups 5, since should the flow into the chamber 10 be excessive, the excess will be drained off by the pipe 17 when the water in the chamber reaches a height where the same enters the top of pipe 17, and then drops downwardly to enter discharge pipe 23.

Having thus described my invention, I claim as new and desire to secure by Letters Patent:—

1. In a drinking fountain, a main basin, a plurality of cups formed integrally on the interior of the basin, a chamber formed in the basin bottom, passages connecting the chamber with the cups and means for supplying water to the chamber, a channel on the outside of the cups and means for conducting the water from the channel.

2. In a drinking fountain, a main basin formed with a circular chamber in its bottom, means to supply water to the chamber, a series of spaced cups on top of the basin bottom, said basin bottom being formed with a series of independent passages which lead from the chamber to the cups, and means connected to the basin and communicating with said space between the cups to conduct the overflow from the cups away from the basin.

3. In a drinking fountain, a main basin having a central hollow post, a hollow member seating on the top of the post, an overflow pipe in the member, means to feed water to the interior of the member, said basin being formed with a circular chamber, cups carried by the basin and communicating with said chamber, and means to carry the water from the interior of said member to said chamber, a water discharge pipe, said basin having a channel which surrounds the cups and collects the overflow therefrom, and an inclined pipe which leads from the channel to said discharge pipe.

4. In a drinking fountain, a main basin, having a central hollow post, a hollow member having its base seating on the top of the post, said member having a hollow extension and an abutment, a pipe in the extension resting on the abutment, a short pipe extending through the bottom of said member, a water feed pipe leading into said bottom of the member, a series of cups in the basin, a circular chamber in the basin connecting with each cup, a pipe leading from the interior of the member to said chamber, a water pipe, and a pipe leading from a channel surrounding the cups to said discharge pipe.

5. In a drinking fountain, a post, a main basin carried by and surrounding the post, a chambered member on top of the post, means to supply water to said member, a series of cups on the interior of the basin, said basin having a chamber common to all of the cups and also having a passage for each cup which leads to the latter from said chamber, means to conduct water from the chambered member to said common chamber, and means connected to the basin to conduct the overflow from the cups away from the basin.

In testimony whereof I have signed my name to this specification in the presence of two subscribing witnesses.

FRED A. THOMAS.

Witnesses:
  ADA E. HAGERTY,
  J. A. MILLER.

---

Copies of this patent may be obtained for five cents each, by addressing the "Commissioner of Patents, Washington, D. C."